US005175842A

United States Patent [19]

Totani

[11] Patent Number: 5,175,842

[45] Date of Patent: Dec. 29, 1992

[54] DATA STORAGE CONTROL SYSTEM CAPABLE OF READING DATA IMMEDIATELY AFTER POWERED ON

[75] Inventor: Tokuyuki Totani, Ome, Japan

[73] Assignee: Kabushiki Kaisha Toshiba, Kanagawa, Japan

[21] Appl. No.: 744,831

[22] Filed: Aug. 13, 1991

Related U.S. Application Data

[63] Continuation of Ser. No. 358,091, May 30, 1989, abandoned.

[30] Foreign Application Priority Data

May 31, 1988 [JP] Japan ................ 63-133620

[51] Int. Cl.[5] ........ G06F 12/16; G06F 1/30; G06F 12/12; G11C 14/00

[52] U.S. Cl. ........ 395/425; 365/228; 364/DIG. 1; 364/243.41; 364/238.4; 364/268.2; 364/273.4; 364/285.1

[58] Field of Search ........ 364/200, 900

[56] References Cited

U.S. PATENT DOCUMENTS

| | | | |
|---|---|---|---|
| 4,020,466 | 4/1977 | Cordi et al. | 364/200 |
| 4,077,059 | 2/1978 | Cordi et al. | 364/200 |
| 4,084,231 | 4/1978 | Capozzi et al. | 364/200 |
| 4,506,323 | 3/1985 | Pusic et al. | 364/200 |
| 4,523,206 | 6/1985 | Sasscer | 364/200 |
| 4,530,054 | 7/1985 | Hamstra et al. | 364/200 |
| 4,530,055 | 7/1985 | Hamstra et al. | 364/200 |
| 4,574,346 | 3/1986 | Hartung | 364/200 |
| 4,811,203 | 3/1989 | Hamstra | 364/200 |
| 4,835,686 | 5/1989 | Furuya et al. | 364/200 |
| 4,837,680 | 6/1989 | Crockett et al. | 364/200 |
| 4,916,605 | 4/1990 | Beardsley et al. | 364/200 |
| 4,920,478 | 4/1990 | Furuya et al. | 364/200 |
| 4,942,579 | 7/1990 | Goodlander et al. | 371/51 |
| 5,051,887 | 9/1991 | Berger et al. | 364/200 |

*Primary Examiner*—Gareth D. Shaw
*Assistant Examiner*—Matthew C. Fagan
*Attorney, Agent, or Firm*—Finnegan, Henderson, Farabow, Garrett and Dunner

[57] ABSTRACT

A data control system includes an external memory unit for storing data, a volatile memory for storing at-least-once accessed data from the external memory unit, a nonvolatile memory for storing frequently-accessed pieces of data among the data stored in the volatile memory, and a memory control unit for controlling the external memory unit and the nonvolatile memory. The frequently-accessed data is stored in the nonvolatile memory, so that when the system is powered down, the nonvolatile memory does not lose the frequently-accessed data. When the power is on, the frequently-accessed data can be again accessed rapidly.

6 Claims, 3 Drawing Sheets

DATA STORAGE CONTROL SYSTEM CAPABLE OF READING DATA IMMEDIATELY AFTER POWERED ON

This application is a continuation of application Ser. No. 07/358,091, filed May 30, 1989, now abandoned.

FIELD OF THE INVENTION

The present invention relates to a data storage control system.

More particularly, the invention concerns with a data storage control system equipped with a cache memory, which is normally directed to process a frequently-accessed area such as a directory or file allocation table of a hard disk drive unit (HDD).

DISCUSSION OF THE RELATED ART

Such a data storage control system typically comprises a host computer, a memory control unit, an external memory unit, a volatile cache memory, and cache management unit.

This type of data storage control system is normally operated as follows. At first, the host computer sends an access request to the memory control unit. Then, the memory control unit instructs the cache management unit to determine whether or not the requested data is saved in a volatile cache memory.

If it is saved in the volatile cache memory, it is transferred to the host computer through the control unit.

If it is not saved, the control unit in turn determines whether or not it is saved in the external memory unit.

If it is saved in the external memory unit, the memory control unit transfers it to the host computer. Then, the memory control unit instructs the cache management unit to determine whether or not the volatile cache memory contains "free space" for the requested data.

If it contains "free space", the requested data is written into the volatile cache memory. If it does not contain "free space", instead, it is written on the area with the least-frequently-accessed data area in the volatile cache memory.

When the host computer sends a write request to the memory control unit, the memory control unit instructs the cache management unit to determine whether or not the write data has been already saved in the volatile cache memory. If it has been saved in the volatile cache memory, only the data in nonvolatile memory is replaced with new written data. If it has not been saved in the memory, the write data is written in the external memory unit in a write-through manner.

When power is interrupted, the volatile cache memory loses the saved data. Immediately after it is powered on, therefore, the volatile memory cannot serve its function when an access request is received from the computer. And thus, the external memory unit starts to work (for example, in a write-through manner). Also, the access time to the external memory unit is considerably longer than that to the volatile cache memory. As a result, the data processing done after power is temporarily interrupted requires more time than that done before a power is interrupted.

As set forth above, the conventional data storage control system is designed to force the volatile memory to lose the data stored in it once the power is interrupted. After it is powered on, the system directs its access to the external memory, resulting in the consumption of more time.

OBJECT AND SUMMARY OF THE INVENTION

The present invention is designed to overcome the foregoing shortcoming, and it is an object of the invention to provide a data storage control system which performs access processing in a short time independent of power-down and power-up operation.

To achieve this object, the invention comprises an external memory unit for storing data, a volatile storage means for storing at-least-one-accessed data in the external memory unit, nonvolatile storage means for storing frequently-accessed data among the data stored in the volatile storage, means, and a memory control unit for controlling data between the external memory unit, the volatile storage means, and the nonvolatile storage means.

According to the invention, at first, the external memory unit stores data and then the volatile storage means stores at-least-once-accessed pieces of data among the data stored in the external memory unit. Next, the nonvolatile memory means stores frequently-accessed pieces of data among the data stored in the volatile storage means. The memory control unit serves to control data transfer between the external memory unit, the volatile storage means, and the nonvolatile storage means.

As such, the data saved on the frequently-accessed area is written into the nonvolatile cache memory so that it may not be lost when power is interrupted. Therefore, even immediately after the power is restored, rapid data transfer is possible.

DETAILED DESCRIPTION OF PREFERRED EMBODIMENT

Hereinafter, one embodiment of the invention will be described in detail with reference to the drawings.

Figure 1:
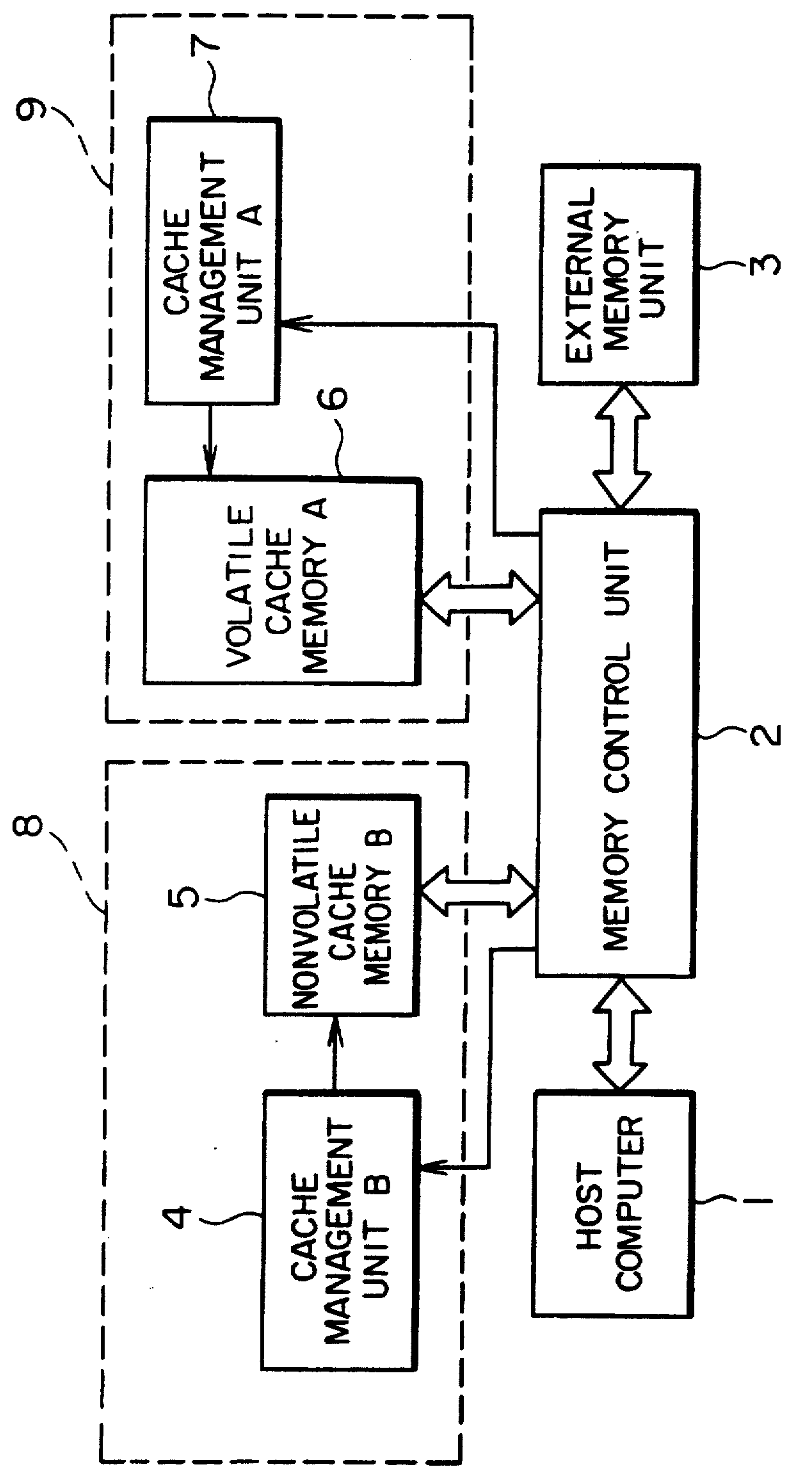
FIG. 1 is a block diagram showing arrangement of a data storage control system according to one embodiment of the invention.

FIG. 1 is a block diagram showing arrangement of a data storage control system according to one embodiment of the invention. The data storage control system comprises a host computer 1, a memory control unit 2, an external memory unit 3, a cache management unit 4, a nonvolatile cache memory 5, a volatile cache memory 6, and a cache management unit 7. The cache management unit 4 and the nonvolatile cache memory 5 compose a nonvolatile storage unit 8 as a nonvolatile storage means. The volatile cache memory 6 and the cache management unit 7 compose a volatile storage unit 9 as a volatile storage means.

The host computer 1 instructs the memory control unit 2 to input or output data. The memory control unit 2 serves to control each component of the overall system.

For example, when the memory control unit 2 reads the data accessed by the host computer 1 from the external memory unit 3, it sends the data to the host computer 1 and the volatile cache memory 6. That is, the volatile cache memory 6 stores at-least-once-accessed data.

The memory control unit 2 transfers frequently-accessed data to the nonvolatile cache memory 5 and stores it therein. Therefore, the nonvolatile cache memory 5 stores the most frequently-accessed data.

The external memory unit 3 is a memory for storing the data sent from the memory control unit 2 and for storing large volumes of data.

The cache management unit 4 controls the nonvolatile cache memory 5.

Figure 2:
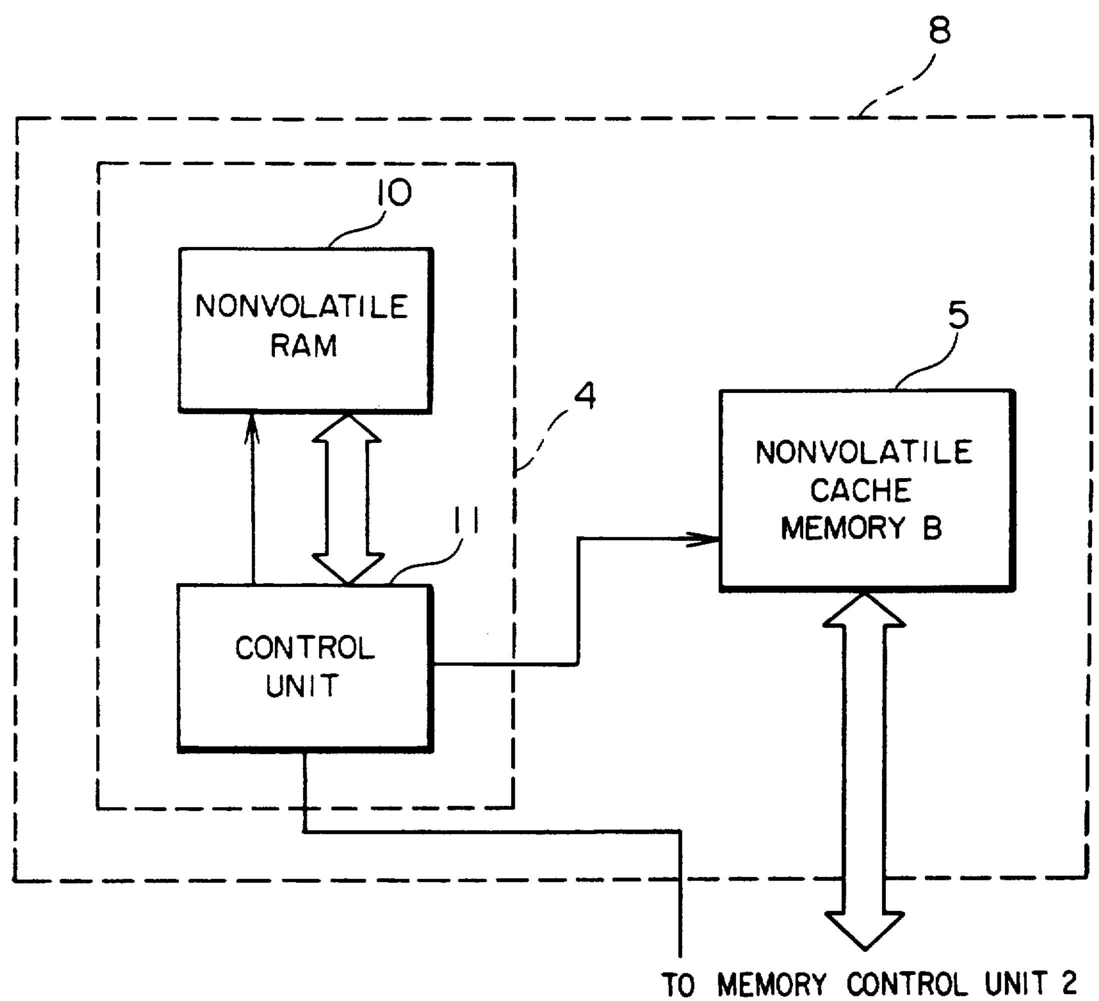
FIG. 2 is a block diagram showing arrangement of a nonvolatile storage unit 8.

FIG. 2 is a block diagram showing arrangement of the nonvolatile storage unit 8. As shown, the cache management unit 4 comprises a nonvolatile RAM 10 and a control unit 11.

The nonvolatile RAM 10 is used for storing information such as the number of the sectors on the external memory unit 3 the data stored in the nonvolatile cache memory 5 corresponds to, an address of the data in the nonvolatile cache memory 5, and access-frequency information of the data which indicates the frequency at which the data is accessed by the host computer.

The control unit 11 reads an address from the nonvolatile RAM 10 and data corresponding to the address from the nonvolatile cache memory 5 in response to the instruction given by the memory control unit 2.

Figure 3:
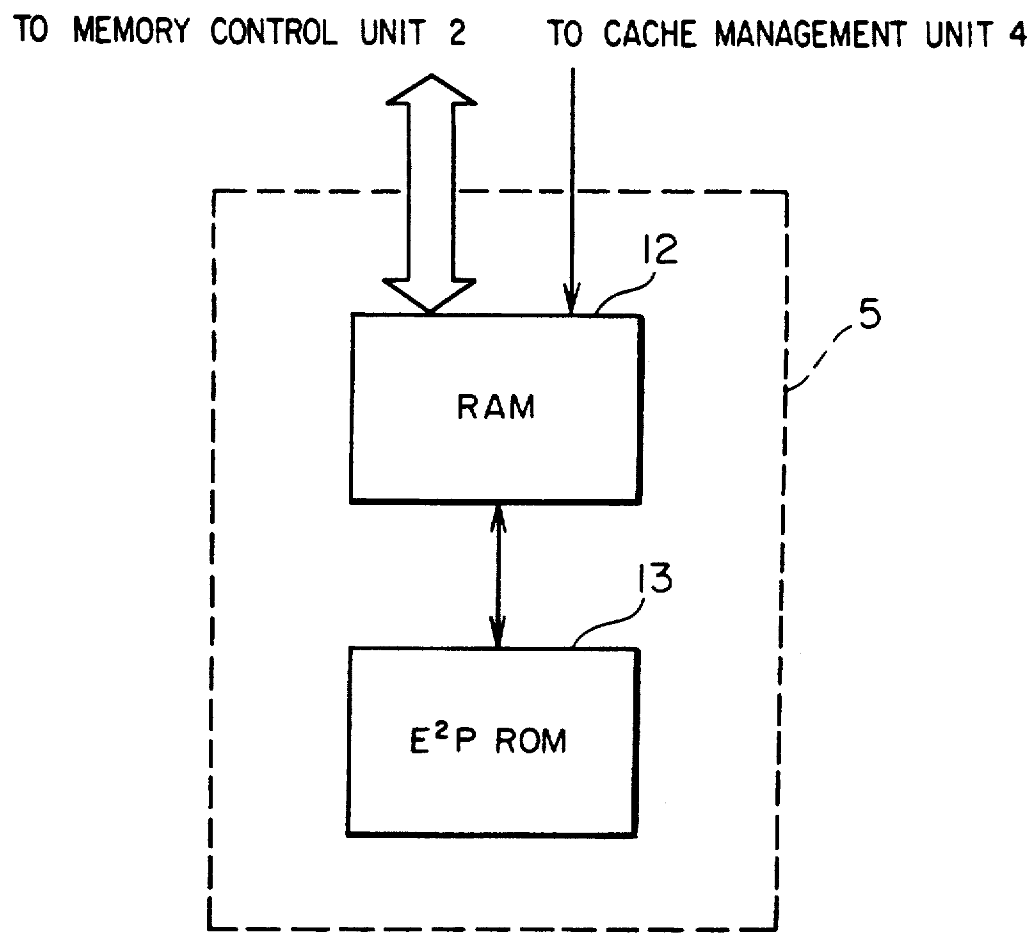
FIG. 3 is a block diagram showing arrangement of a nonvolatile cache memory 5.

The nonvolatile cache memory 5 stores frequently-accessed data among the data saved in the external memory unit 3 and input by the host computer 1 under the control of the cache management unit 4. FIG. 3 is a block diagram showing arrangement of the nonvolatile cache memory 5, which comprises a RAM 12 and $E^2$-PROM 13.

The volatile cache memory 6 stores at-least-once-accessed data among the data stored in the external memory unit 3 under the control of the cache management unit 7. The cache management unit 7 serves to control the volatile cache memory 6.

The cache management unit 7 includes a control unit (not shown) and a volatile RAM. The volatile RAM stores information such as the number of the sector on the external memory unit 3 the data stored in the volatile cache memory 6 corresponds to, an address of the data on the volatile RAM, and access-frequency information of the data. The control unit reads the address from the volatile RAM and the data corresponding to the address from the volatile cache memory 6 in response to the instruction of the memory control unit 2.

Next, the operation of the data storage control system will be described.

When the host computer 1 transfers an access request to the memory control unit 2, the memory control unit 2 instructs the cache management unit 4 to determine whether or not the requested data is saved in the nonvolatile cache memory 5.

If it is saved, the requested data is transferred to the host computer 1 through the memory control unit 2.

If it is not saved, the memory control unit 2 instructs the cache management unit 7 to determine whether or not it is saved in the volatile cache memory 6.

If it is saved in the volatile cache memory 6, the requested data is transferred to the host computer 1 through the memory control unit 2.

If it is not saved in it, the memory control unit 2 determines whether or not it is saved in the external memory unit 3.

If it is saved in the external memory unit 3, the requested data is transferred to the host computer 1 through the memory control unit 2.

In this instance, the memory control unit 2 instructs the cache management unit 7 to determine whether or not the volatile cache memory 6 contains "free space" on which the requested data is written. If the volatile memory 6 has "free space", the data is written on the volatile cache memory 6. If the volatile memory 6 does not have "free space", the data is written on the least-frequently-accessed data area in the volatile cache memory 6.

When the host computer 1 sends a write request to the memory control unit 2, the memory control unit 2 instructs the cache management unit 4 to determine whether or not the write-requested data record has been already saved in the nonvolatile cache memory 5. If it is saved, only the data in nonvolatile memory is replaced with new written data. If not saved, the requested data record is written in the external memory unit 3 in a write-through manner.

On the other hand, when the host computer 1 does not send a signal to the memory control unit 2, that is, in an idling time, the memory control unit 2 serves to operate the cache management unit 7 and the cache management unit 4 so based upon a comparison of accessfrequency information corresponding to data stored in the nonvolatile cache memory 5 and access-frequency information corresponding to data to be written thereto from the volatile cache memory 6, the data stored in the volatile cache memory 6 is moved to the nonvolatile cache memory 5 if the data stored in the volatile cache memory 6 is more frequently accessed than data stored in the nonvolatile cache memory 5. The data saved in the nonvolatile cache memory 5 is written into the external memory unit 3 through the memory control unit 2. If the nonvolatile cache memory 5 saves more frequently-accessed data than the volatile cache memory 6, the data is also written on the volatile cache memory 6.

As set forth above, according to the embodiment, even immediately after the system is powered on, the frequently-accessed data is not lost, since it is written on the nonvolatile cache memory 5. As such, immediately after powered on, rapid data transfer is possible.

And, since the more frequently-accessed area data is stored in the cache memory when it is written or read, rapid data transfer is possible. The reason is as follows. It takes a long time to access the data on the external memory 3, because a head (not disclosed) must be physically moved. However, it takes a shorter time to access the data on cache memory, because the cache memory is made of a semiconductor.

What is claimed is:

1. A data storage control system for use with a host computer, comprising:

external memory means for storing data;

volatile storage means for storing data accessed at least once from said external memory means together with access-frequency information corresponding to the data accessed at least once;

nonvolatile storage means for storing data having relatively high access-frequency together with access-frequency information corresponding to the data having relatively high access-frequency; and memory control means, connected to said host computer, said external memory means, said volatile storage means, and said nonvolatile storage means, for writing data accessed by said host computer at least once from said external memory means together with the access-frequency information corresponding to the data accessed at least once into said volatile storage means, and for writing data having relatively high access-frequency together with the access-frequency information corresponding to the data having relatively high access-frequency into said nonvolatile storage means, wherein said memory control means determines whether data to be written into said nonvolatile storage means, has a relatively high access-frequency into said nonvolatile storage means, wherein said memory control means determines whether data to be written into said nonvolatile storage means, has a relatively high access-frequency based on a comparison of the access-frequency information corresponding to the data to be written and access-frequency information corresponding to data stored in said nonvolatile storage means.

2. The data storage control system of claim 1, wherein said memory control means upon receiving a request from said host computer to write a specific data record, first determines whether said specific data record had previously been stored in said nonvolatile storage means, then if a determination is made that said specific data record had previously been stored in said nonvolatile storage means, said memory control means writes said specific data record had not previously been stored in said nonvolatile storage means, then said memory control means writes said specific data record into said external memory means.

3. The data storage control system of claim 1, wherein said memory control means upon receiving a request from said host computer to read requested data, first searches for the requested data in said nonvolatile storage means, and then in said volatile storage means, and subsequently in said external memory means, said memory control means stops searching and reads said requested data from one of said nonvolatile storage means, said volatile storage means, and said external memory means, once the requested data is found, said memory control means then transfers said requested data to said host computer.

4. The data storage control system of claim 3, wherein said memory control means upon receiving a request from said host computer to write a specific data record, first determines whether said specific data record had previously been stored in said nonvolatile storage means, then if a determination is made that said specific data record had previously been stored in said nonvolatile storage means, said memory control means writes said specific data record into said nonvolatile storage means, and if said specific data record had not previously been stored in said nonvolatile storage means, then said memory control means writes said specific data record into said external memory means.

5. The data storage control system of claim 1, wherein in idling time said memory control means detects data stored in said volatile storage means having a corresponding access-frequency that is greater than that of data stored in said nonvolatile storage means and transfers the detected data and access-frequency information corresponding to the detected data to said nonvolatile storage means.

6. The data storage control system of claim 5, wherein said memory control means upon receiving a request from said host computer to write specific data record, first determines whether said specific data record had previously been stored in said nonvolatile storage means, then if a determination is made that said specific data record had previously been stored in said nonvolatile storage means, said memory control means writes said specific data record into said nonvolatile storage means, and if said specific data record had not previously been stored in said nonvolatile storage means, then said memory control means writes said specific data record into said external memory means.

* * * * *